United States Patent [19]

Montgomery

[11] Patent Number: 4,606,377
[45] Date of Patent: Aug. 19, 1986

[54] PIPE REPAIR CLAMP

[75] Inventor: Ronald S. Montgomery, Gainesville, Tex.

[73] Assignee: Muenster Clamp, Inc., Muenster, Tex.

[21] Appl. No.: 666,472

[22] Filed: Oct. 30, 1984

[51] Int. Cl.⁴ ............................................. F16L 55/16
[52] U.S. Cl. ....................................................... 138/99
[58] Field of Search ................. 138/99, 147, 149, 158; 24/279, 280, 281, 282

[56] References Cited

U.S. PATENT DOCUMENTS

| | | | |
|---|---|---|---|
| 14,503 | 8/1918 | Swaidmark | 24/281 |
| 1,340,938 | 5/1920 | Cooper | 24/286 |
| 1,369,851 | 3/1921 | Swaidmark | 24/281 |
| 1,397,943 | 11/1921 | Costello | 24/281 X |
| 1,407,583 | 2/1922 | Schroeder | 24/281 X |
| 1,455,067 | 5/1923 | Berman | 24/286 |
| 2,370,766 | 3/1945 | Austin | 24/280 |
| 2,690,193 | 9/1954 | Smith | 138/99 |
| 2,834,086 | 5/1958 | Smith et al. | 138/99 X |
| 2,897,568 | 8/1959 | Hoke | 24/279 |
| 2,936,186 | 5/1960 | Dunmire | 24/279 X |
| 3,173,450 | 3/1965 | Halterman | 138/99 |
| 3,204,665 | 9/1965 | Faint | 138/99 |
| 3,692,062 | 9/1972 | Dunmire | 24/285 X |
| 3,914,833 | 10/1975 | Dunmire | 24/279 |
| 4,381,020 | 4/1983 | Daghe et al. | 138/99 |
| 4,409,708 | 10/1983 | Hauffe | 24/279 |

FOREIGN PATENT DOCUMENTS

| | | | |
|---|---|---|---|
| 985336 | 7/1951 | France | 24/281 |
| 442903 | 1/1968 | Switzerland | 24/281 |

Primary Examiner—Stephen Marcus
Assistant Examiner—Mark Thronson
Attorney, Agent, or Firm—Hubbard, Thurman, Turner & Tucker

[57] ABSTRACT

Disclosed is a clamp for repairing a pipe. The clamp includes a flexible metal band which is held about the pipe by a pair of lugs. One of the lugs is immovably connected to the end of the band and the other lug is adjustably connected so that the length of the band between the lugs may be varied so as to accommodate different outside diameter pipes. An elastomeric gasket sheet is attached to the metal band at its central portion and includes two free ends. The gasket sheet is long enough to encircle the pipe with one of its free ends overlapping the other. The overlapping free end includes a metal strip which underlies the lugs. The gasket sheet is preferably wider than the metal band and has one edge which extends outwardly of the metal band. The outwardly extending edge is reduced in thickness and is adapted to cooperate with a channel formed in the edge of the gasket sheet of an adjacent pipe prepared clamp so that multiple clamps may be stacked lengthwise together.

18 Claims, 5 Drawing Figures

PIPE REPAIR CLAMP

BACKGROUND OF THE INVENTION

A. Field of the Invention

The present invention relates generally to a pipe repair clamp and more particularly to a single pipe repair clamp that is adapted to repair pipes of varying diameter and to a pipe repair clamp that may be used with other similar pipe repair clamps to repair various lengths of damaged pipe.

B. Description of the Prior Art

The use of pipe repair clamps to repair breaks or leaks in pipes is well known. A typical clamp includes a gasket strip which is wrapped around the pipe over the broken or leaking area and a flexible band that is in turn wrapped around the gasket sheet. The band is normally held together by a pair of lugs attached to the ends of the band and held together by bolts or the like. Typically, a metal strip is attached to one of the ends of the gasket sheet and is positioned to underlie the lugs. Examples of pipe repair clamps of the foregoing type are disclosed in any one of the following patents: Hauffe U.S. Pat. No. 4,409,708; Daghe et al. U.S. Pat. No. 4,381,020; Dunmire U.S. Pat. No. 3,914,833; Hoke U.S. Pat. No. 2,897,568; and Halterman U.S. Pat. No. 3,173,450.

The devices of the foregoing enumerated patents are adapted for use in repairing pipes of a single diameter. Since most piping systems include pipes of varying diameter and type, it is necessary for the pipe repair facilities to stock a large number of repair clamps adapted for various diameter pipes. Additionally, the presently existing pipe repair clamps are of fairly uniform width so as to cover a fairly uniform length of pipe. However, occasionally the broken or leaking area of the pipe is longer than the width of the standard pipe repair clamp. Accordingly, it is necessary for the pipe repair facility to stock overwidth clamps so as to be able to accommodate such longer breaks. A shortcoming of such overwidth repair clamps is that it is difficult to know how long to make them and, due to the varying diameters of the pipes, a large number of them must be inventoried at all times.

It is therefore an object of the present invention to provide a single pipe repair clamp that is adaptable to repair breaks or leaks in pipes over a large range of diameters. It is a further object of the present invention to provide a pipe repair clamp of a uniform optimum width that is adaptable to be used with similar pipe repair clamps to repair breaks or leaks over a substantial length of the pipe.

SUMMARY OF THE INVENTION

Briefly stated, the foregoing and other objects are satisfied by the pipe repair clamp of the present invention. The pipe repair clamp of the present invention includes a flexible metal band having a length sufficient to at least partially encircle the pipe and a convenient width. A first lug is connected to one end of the metal band and a second lug is adjustably connected adjacent the other end of the metal band. Each of the lugs includes at least two fingers which are adapted to engage the other lug thereby to stablize the lugs and prevent rotation thereof. The second lug is adjustably connected to the metal band so that when the metal band is wrapped around the pipe the fingers of each lug are properly positioned, whereby the pipe repair clamp may be used on pipes of varying diameters.

An elastomeric gasket sheet having an outside surface facing the band and an inside surface facing the pipe is attached at its central portion to the metal band. The gasket sheet has two free ends and a length sufficient to encircle the pipe with one of the free ends overlapping the other.

The gasket sheet may have a width greater than that of the metal band, with one of its edges being coincident with one of the edges of the metal band and its other edge extending outwardly of the metal band. The inside surface of the gasekt sheet at the edge coincident with the metal band has a lengthwise extending reduced thickness portion which defines a channel. The outside surface of the gasket sheet that extends outwardly of the metal band is of a reduced thickness. Thus, similar pipe clamps of the present invention may be in effect stacked along the pipe with their gasket sheets overlapping.

A pair of metal strips disposed one on top of the other are attached to the outside surface of the gasket sheet near one of its free ends. The metal strips are positioned to underlie the lugs when the metal band is wrapped around the pipe. The lugs are drawn and held together by a plurality of bolts or the like, thereby to urge the gasket sheet into sealing engagement with the pipe.

DESCRIPTION OF THE PREFERRED EMBODIMENT

Figure 1:
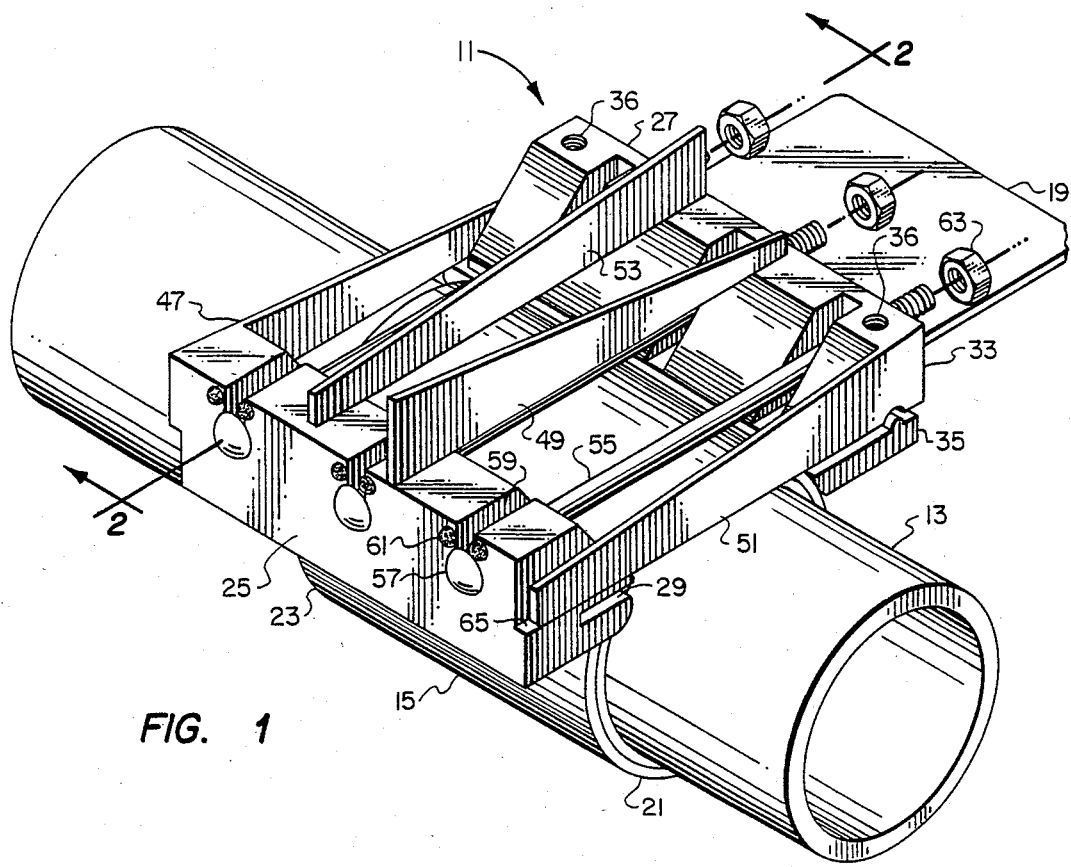
FIG. 1 is a perspective view of the pipe repair clamp of the present invention positioned about a pipe.
Figure 2:
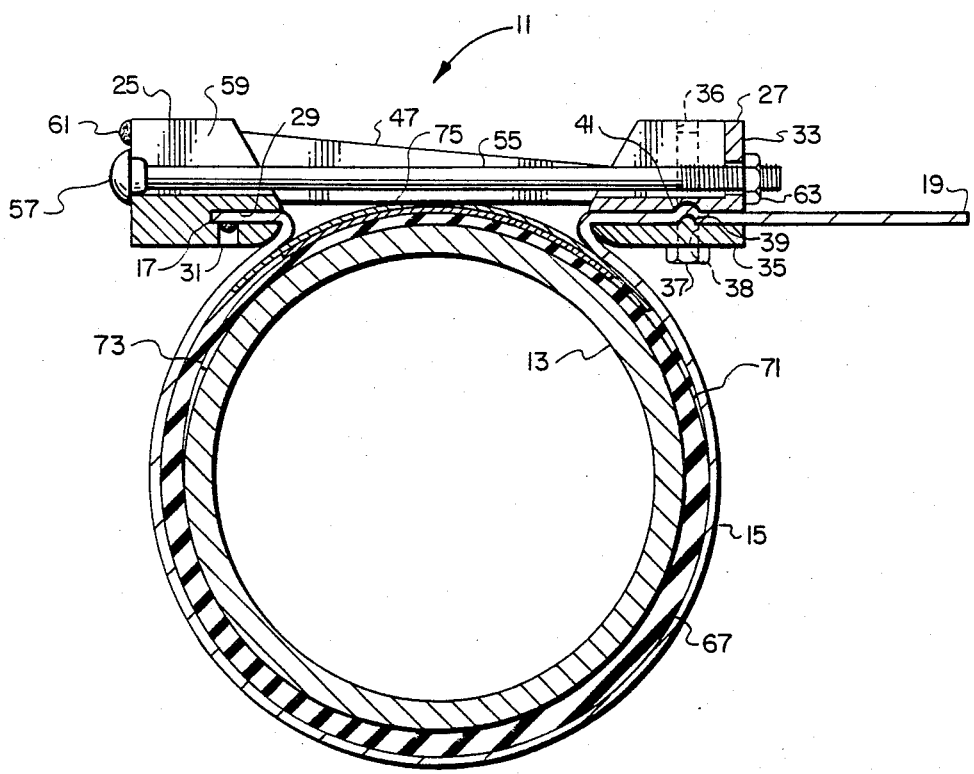
FIG. 2 is a sectional view taken along line 2—2 of FIG. 1.

Referring now to the drawings, and first to FIGS. 1 and 2, the pipe repair clamp of the present invention is designated generally by the numeral 11. Pipe repair clamp 11 is adapted for repairing a leak or break in a pipe 13.

Pipe repair clamp 11 includes a flexible metal band 15, which has a first end 17 and a second end 19. The length of metal band 15 between ends 17 and 19 is sufficient to at least partially encircle pipe 13, but is preferably longer than the outside circumference of the largest outside diameter pipe for which it is contemplated to use pipe repair clamp 11. Metal band 15 has a pair of edges 21 and 23 with a convenient width therebetween chosen to provide a normally sufficient sealing length.

Metal band 15 is held about pipe 13 by a pair of lugs, including a first lug 25 and a second lug 27. First lug 25 is preferably a unitary cast metal structure. The connection between first lug 25 and first end 17 of metal band 15 is established by an elongated slot 29 formed in first lug 25. First end 17 is preferably retained in slot 29 by forming a plurality of holes 31 on the bottomside of lug 25 which intersects slot 29 and depositing a quantity of tack weld material upon the surface of metal band 15 in the hole 31.

Second lug 27 is a two-part structure which includes a unitary top bar 33 and a base bar 35. Top bar 33 and base bar 35, which form second lug 27, are the same width as first lug 25, and both are wider than metal band 15. Top bar 33 and base bar 35 are held in clamping arrangement with metal band 15 therebetween by a pair of bolts 37 (one of which is shown in FIG. 2). Bolts 37 are positioned in bolt holes 36 formed in top bar 33 and base bar 35 outboard of edges 21 and 23 of metal band 15. In the preferred embodiment, bolt holes 36 in top bar 33 are threaded to receive bolts 37, while bolt holes 38 in base bar 35 are unthreaded. The length of the threaded portion of holes 36 allows substantial torque to be applied to bolts 37 to clamp base bar 35 and top bar 33 together with great force.

Metal band 15 adjacent its second end 19 is immovably clamped between top bar 33 and base bar 35. Base bar 35 includes a lengthwise extending ridge 39 which registers with a lengthwise extending groove 41 formed in top bar 33. As top bar 33 and base bar 35 are drawn together by bolts 37, ridge 39 deforms metal band 15 into groove 41, thereby to enhance the immovability of metal band with respect to second lug 27. Preferably, the curvatures of ridge 39 and groove 41 are chosen so as to deform metal band 15 past its elastic limit. In order to further stiffen base bar 35, the height of ridge 39 may be greater at is the center of base bar 35 than at the ends. Ridge 39 may include teeth or the like to better grip metal band 15. Also, as an alternative to ridge and groove arrangement of the preferred embodiment, one of base bar 35 or top bar 33 may include one or more indentations while the other includes corresponding projections, such as the ends of bolts, which deforms metal band 15 into the indentations.

Lugs 25 and 27 are drawn and held together by a plurality of carriage bolts 55. For ease of assembly, the head 57 of carriage bolt 55 is received in a slot 59 in the top of lug 25. Hemispherical projections 61 are provided at the mouth of slot 59 to retain heads 57 of carriage bolts 55. The ends of carriage bolts 55 are retained on second lug 27 by nuts 63.

Each lug 25 and 27 includes at least a pair of fingers. More specifically, first lug 25 includes a side finger 47 and a top finger 49. Similarly, second lug 27 includes a side finger 51 and a top finger 53. The fingers bridge the gap between lugs 25 and 27 and provide stability thereto.

The fingers counteract the tendency of lugs 25 and 27 to rotate as they are drawn together by carriage bolts 55. End finger 51 of second lug 27 is received in a notch 65 in first lug 25. A similar notch, which is not shown, is provided in second lug 27 to receive side finger 47 of first lug 25. Top finger 49 of first lug 25 engages the top of second lug 27. Similarly, top finger 53 of second lug 27 engages the top of first lug 25. Any rotation of lugs 25 or 27 during tightening of carriage bolts 55 is counteracted by the fingers. Additionally, the coaction of side fingers 47 and 51 with their respective notches 65 provides lateral stability and alignment during assembly and makeup.

Figure 3:
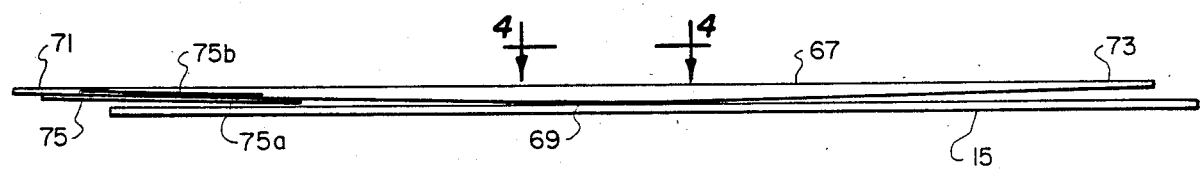
FIG. 3 is a side view of the metal band and gasket sheet of the present invention laid out flat.

Pipe repair clamp 11 includes an elastomeric gasket sheet 67 which is wrapped about pipe 13 and held in place by metal band 15. Gasket sheet 67 provides the actual seal to repair the break or leak in pipe 13. As is best shown in FIG. 3, gasket 67 includes a central portion 69 which is attached to metal band 15 and two free ends 71 and 73. The length of gasket sheet 67 between free ends 71 and 73 is sufficient for gasket sheet 67 to encircle pipe 13 with end 71 overlapping end 73. The thickness of gasket sheet 67 preferably is reduced in tapering fashion between central portion 69 and free ends 71 and 73 so as to make the overlapping portions of gasket sheet 67 more uniform in thickness. A metal strip 75 is attached to the outer surface of sealing gasket 67 adjacent free end 71. Metal strip 75 is positioned to underlie lugs 25 and 27, as shown in FIG. 2. Thus, metal band 15 and metal strip 75 completely encircle gasket sheet 67 and urge it into sealing contact with pipe 13 by the action of lugs 25 and 27.

Since pipe repair clamp 11 is adapted for use with pipes of different diameters and, hence different curvatures, metal strip 75 is initially flat and adapted to be bent to fit the curvature of the pipe. Since metal strip 75 is relatively short in length as compared to metal band 15, if metal strip 75 were made of material of the same thickness as metal band 15, metal strip 75 would be very hard to bend, particularly by hand. Accordingly, in the preferred embodiment, metal strip 75 includes two thin relatively flexible strips disposed one on top of the other. The outer strip 75a is longer than the inner strip 75b and its ends extend outwardly of the ends of inner strip 75b. Each strip 75a and 75b has a thickness about half that of metal band 15 so each is substantially more flexible than metal band 15. When gasket sheet 67 is wrapped initially about pipe 13, the ends of outer strip 75a may be bent into general conformity with pipe 13. As lugs 25 and 27 are drawn together, both outer strip 75a and inner strip 75b are bent to the proper curvature.

Figure 4:
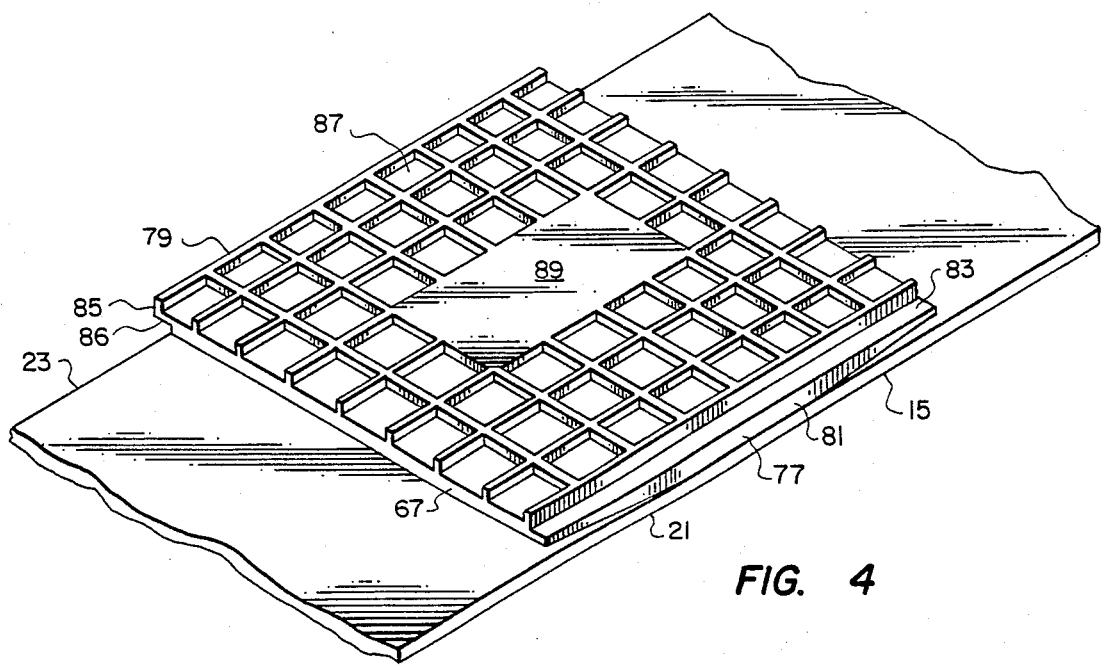
FIG. 4 is a view taken along line 4—4 of FIG. 3 showing details of the gasket sheet of the pipe repair clamp of the present invention.

Referring now to FIG. 4, gasket sheet 67 includes a pair of edges 77 and 79. In the preferred embodiment, the width of gasket sheet 67 between edges 77 and 79 is wider than the width of metal band 15 between edges 21 and 23. Edge 77 is positioned to coincide with edge 21 of metal band 15 and, accordingly, edge 79 extends outwardly of edge 23.

Figure 5:
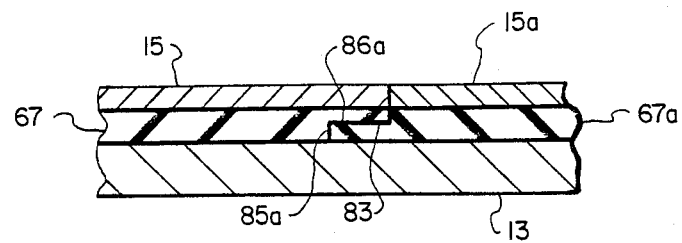
FIG. 5 is partial section showing portions of two adjacent stacked pipe repair clamps.

Gasket sheet 67 includes adjacent edge 77 a lengthwise extending reduced thickness portion 81 which defines a lengthwise extending inwardly facing channel 83 in the inside surface of gasket sheet 67. Similarly, gasket sheet 67 includes adjacent edge 79 a lengthwise extending reduced thickness portion 85 which defines an outwardly facing channel 86 and extends outwardly of edge 23 of metal band 15. Channel 83 cooperates with a channel 86 of an adjacent pipe repair clamp to enable multiple clamps to be stacked, thereby to increase the length sealed. For example, referring to FIG. 5, there is shown a portion of an adjacent clamp which includes a metal band 15a and a gasket sheet 67a positioned about pipe 13. A reduced thickness portion 85a extends outwardly of the edge of metal band 15a and is received in channel 83. Channels 83 and 86a cooperate to form a seal.

Referring again to FIG. 4, the inside surface of gasket sheet 67 preferably has a waffle finish 87. Waffle finish 87 enhances the seal obtained against pipe 13. The inside surface of gasket sheet 67 also preferably includes one or more lengthwise extending strips 89, which contact pipe 13 and provide a measure of resistance to slippage.

In operation, second lug is positioned on metal band 15 at a position appropriate to the pipe to be repaired. With second lug 27 so positioned, bolts 37 are tightened to draw base bar 35 and top bar 33 of second lug 27 into clamping engagement with metal band 15 and to deform a portion of metal band 15 into groove 41 of top 33 by the action of ridge 39 of base bar 35.

After second lug 27 has been affixed to metal band 15, gasket sheet 67 is wrapped around pipe 13 with free end 71 overlapping free and 73. Then, metal band 15 is wrapped around gasket sheet 67 with lugs 25 and 27 overlying metal strip 75 and drawn together with carriage bolts 55. Conveniently, the ends of carriage bolts 55 are first inserted through the holes in second lug 27 and nuts 63 are engaged with the bolts 55 ends. Then, the heads of carriage bolts 55 are swung or pivoted past projections 61 and into slots 59 of first lug 25. With carriage bolts 55 so positioned, nuts 63 are lightened to draw together lugs 25 and 27 and urge gasket sheet 67 into sealing engagement with pipe 13.

If the broken or leaking portion of pipe 13 is longer than the width of clamp 11, two or more clamps 11 may be stacked end-to-end to seal the break or leak. To do so, a first clamp 11 is positioned in the foregoing manner over a portion of the leak. Then, a second clamp is positioned adjacent the first clamp with its channel 83 engaging the reduced thickness portion 85 of the first clamp. Of course, the lugs of the second clamp must be offset from the lugs of the first clamp so that the metal bands of the two clamps can be abutted with each other. The lugs of the second clamp are then drawn together to seal the leak.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A clamp for repairing a pipe, which comprises:
   a flexible metal band having first and second ends with a length therebetween sufficient to at least partially encircle said pipe, and a pair of edges with a width therebetween;
   a first lug connected to said first end of said metal band, said first lug including a plurality of fingers;
   a second lug adjustably connected to said metal band, said second lug including a plurality of fingers, the connection between said second lug and said metal band being readily positioned at any desired location along the length of said metal band so that when said metal band is wrapped around said pipe, the fingers of each lug engage the other lug and the excess of said metal band extends beyond said second lug;
   an elastomeric gasket sheet having an outside surface facing said metal band and an oppositely facing inside surface with a portion of said outside surface being attached to said metal band and said gasket sheet including two free ends, said gasket sheet having a pair of edges with a width therebetween and a thickness between said inside and outside surfaces, and said gasket sheet having a length sufficient to encircle said pipe with one of said free ends overlapping the other of said free ends;
   a metal strip attached to the outside surface of one of said free ends of said gasket sheet, said metal strip underlying said lugs when said metal band is wrapped around said pipe;
   and means for drawing together said first and second lugs when said metal band is wrapped around said pipe to urge said gasket sheet into sealing engagement with said pipe.

2. The clamp as claimed in claim 1, wherein said second lug includes:
   a base bar, having a lengthwise extending ridge, positioned at any desired lengthwise location on one side of said metal band;
   a top bar positioned opposite said base bar on the other side of said metal band, said top bar including a lengthwise extending groove formed therein in registry with said ridge of said base bar;
   means for holding said top bar and said base bar positioned at the desired location on opposite sides of said metal band and urging said top bar and base bar together to deform a portion of said metal band into said groove of said top bar;
   wherein the curvatures of the longitudinal edges of said ridge and said groove are such as to deform said metal band past its elastic limit.

3. The clamp as claimed in claim 2, wherein said means for holding said top bar and said base bar positioned on opposite sides of said metal band includes:
   a pair of threaded bolt holes formed in said top bar adjacent the ends thereof, said bolt holes being spaced further apart than the width of said metal band;
   a pair of bolt holes formed in said base bar in registry with said threaded bolt holes in said top bar;
   and a pair of bolts engaging said bolt holes in said top and base bars.

4. The clamp as claimed in claim 1, wherein said second lug includes:
   a base bar positioned at any desired lengthwise location on one side of said flexible band;
   a top bar positioned opposite said base bar on the other side of said flexible band;
   and means for clamping said base and top bars in engagement with said flexible band at the desired location thereon.

5. The clamp as claimed in claim 4, wherein said clamping means includes:
   a pair of bolt holes formed in said base bar adjacent the ends thereof, said bolt holes being spaced apart farther than the width of said metal band;
   a pair of bolt holes formed in said top bar adjacent the ends thereof, said bolt holes being spaced apart farther than the width of said metal band;
   and a pair of bolts engaging said bolt holes in said base and top bars.

6. The pipe repair clamp as claimed in claim 5, wherein:
   said base bar includes a lengthwise extending ridge;
   said top bar has a lengthwise extending groove formed therein in registry with said ridge and said ridge deforms said flexible band into said indentation.

7. The clamp as claimed in claim 1, wherein the width of said gasket sheet is greater than the width of said metal band and one edge of said gasket sheet is coincedent with one edge of said metal band whereby the other edge of said gasket sheet extends outwardly of said metal band, and wherein said inside surface of said gasket sheet includes along the edge coincedent with said one edge of said metal band a lengthwise extending reduced thickness portion which defines an inwardly facing channel and said outside surface of said gasket sheet extending outwardly of said metal band includes a lengthwise extending reduced thickness portion which defines an outwardly facing channel.

8. The clamp as claimed in claim 1, wherein the thickness of said gasket sheet is reduced in tapering fashion toward said free ends.

9. The clamp as claimed in claim 1, wherein said inside surface of said gasket sheet has a waffle pattern formed thereon.

10. The clamp as claimed in claim 9, wherein said inside surface of said gasket sheet includes a lengthwise extending strip adapted to contact the pipe.

11. The clamp as claimed in claim 1, wherein:
said first lug includes a lengthwise extending slot which receives said first end of said metal band and a plurality of holes which intersect said slot and the connection between said first lug and said first end of said metal band is established by depositing weld material on said metal band through said holes.

12. The clamp as claimed in claim 1, wherein one edge of said gasket sheet extends outwardly of said metal band, and the outside surface of said gasket sheet extending outwardly of said metal band includes a lengthwise extending reduced thickness portion which defines an outwardly facing channel.

13. The clamp as claimed in claim 1, wherein one edge of said gasket sheet is coincedent with one edge of said metal sheet and said inside surface of said gasket sheet includes along said one edge a lengthwise extending reduced thickness portion which defines an inwardly facing channel.

14. The clamp as claimed in claim 1, wherein said means for drawing together said first and second lugs includes a pluarlity of bolts connected therebetween and wherein one of said lugs includes a plurality of slots formed in said lug for receiving the shafts of said bolts near their heads when said bolts are already connected at their other ends to the other of said lugs, and means cooperative with said heads for preventing said bolts from coming out of said slots.

15. The clamp as claimed in claim 1, wherein said metal strip includes:
an inner strip affixed to the outside surface of said gasket sheet;
an outer strip affixed to the outside surface of said gasket sheet on top of said inner strip, with the ends of said outer strip extending outwardly of the ends of said inner strip, wherein the thickness of each of said inner and outer strips is less than the thickness of said metal band.

16. The clamp as claimed in claim 1, wherein:
said second lug includes a base bar and a top bar positioned at any desired lengthwise location on opposite sides of said metal band;
wherein one of said base bar and top bar includes an indentation and the other of said base bar and top bar includes a projection, with said projection deforming said metal band into said indentation.

17. The clamp as claimed in claim 16, wherein said projection includes a rigid and said indentation includes a groove.

18. A clamp for repairing a pipe, which comprises:
a flexible metal band having a pair of ends with a length therebetween sufficient to at least partially encircle said pipe and a pair of edges with a width therebetween;
a pair of lugs connected to said ends of said metal band;
an elastomeric gasket sheet having an outside surface facing said metal band on an oppositely facing inside surface with a portion of said outside surface being attached to said metal band and said gasket sheet having two free ends, said gasket sheet including a pair of edges with a width therebetween greater than the width of said metal band with one of said edges of said gasket sheet being coincedent with one edge of said metal band whereby the other edge of said gasket sheet extends outwardly of said metal band, wherein said inside surface of said gasket sheet along the edge coincedent with said metal band includes a lengthwise extending reduced thickness portion defining a lengthwise extending channel in said inside surface and wherein said outside surface of said gasket sheet along the edge thereof which extends outwardly of said metal band includes a lengthwise extending reduced thickness portion, said gasket sheet having a length sufficient to encircle said pipe with one of said free ends overlapping the other of said free ends;
and means for drawing together said lugs when said metal band is wrapped around said pipe to urge said gasket sheet into sealing engagement with said pipe.

* * * * *

UNITED STATES PATENT AND TRADEMARK OFFICE
CERTIFICATE OF CORRECTION

PATENT NO. : 4,606,377
DATED : August 19, 1986
INVENTOR(S) : Ronald S. Montgomery It is certified that error appears in the above-identified patent and that said Letters Patent is hereby corrected as shown below:

In Claim 17, line 2, delete "rigid" and insert

--ridge--.

Signed and Sealed this

Eleventh Day of November, 1986

*Attest:*

DONALD J. QUIGG

*Attesting Officer*      *Commissioner of Patents and Trademarks*